(12) United States Patent
Rathbun

(10) Patent No.: US 8,839,367 B2
(45) Date of Patent: Sep. 16, 2014

(54) AUTOMATING CALLS BETWEEN SEPARATE AND DISTINCT APPLICATIONS FOR INVOKING AN IDENTITY VERIFICATION FUNCTION

(75) Inventor: George Steven Rathbun, Mystic, CT (US)

(73) Assignee: Avalanche Cloud Corporation, Salt Lake City, UT (US)

( * ) Notice: Subject to any disclaimer, the term of this patent is extended or adjusted under 35 U.S.C. 154(b) by 100 days.

(21) Appl. No.: 13/562,288

(22) Filed: Jul. 30, 2012

(65) Prior Publication Data

US 2014/0033273 A1 Jan. 30, 2014

(51) Int. Cl.
*H04L 29/06* (2006.01)
*G06F 21/36* (2013.01)
*G06F 21/44* (2013.01)
*G06F 21/42* (2013.01)

(52) U.S. Cl.
CPC ............... *G06F 21/36* (2013.01); *G06F 21/44* (2013.01); *G06F 21/42* (2013.01)
USPC .......................................................... 726/3

(58) Field of Classification Search
CPC .......... G06F 21/36; G06F 21/42; G06F 21/44
USPC .......................................................... 726/3
See application file for complete search history.

(56) References Cited

U.S. PATENT DOCUMENTS

| | | | |
|---|---|---|---|
| 8,078,483 B1 * | 12/2011 | Hirose et al. ..................... 705/5 |
| 8,140,418 B1 | 3/2012 | Casey et al. | |
| 8,380,177 B2 | 2/2013 | Laracey | |
| 2012/0203665 A1 * | 8/2012 | Morgan et al. ............. 705/26.41 |
| 2012/0209749 A1 * | 8/2012 | Hammad et al. ............. 705/27.1 |
| 2012/0284130 A1 | 11/2012 | Lewis et al. | |
| 2013/0054320 A1 | 2/2013 | Dorso et al. | |
| 2013/0054413 A1 | 2/2013 | Brendell et al. | |
| 2013/0124855 A1 | 5/2013 | Varadarajan et al. | |
| 2013/0145446 A1 | 6/2013 | Dorso et al. | |

* cited by examiner

*Primary Examiner* — Michael S McNally
(74) *Attorney, Agent, or Firm* — St. Onge Steward Johnston & Reens LLC

(57) ABSTRACT

A method, software and system allows for the novel and seamless integration between disparate hardware and software systems to facilitate strong authentication and identity assertion of an individual as an integral component of transaction processing. The method, software and system can combine quick response (QR) code(s) with more custom mobile device uniform resource locator (URL) scheme(s) to seamlessly invoke mobile application(s) that enable an end user to perform strong, multi-factor authentication as a component of completing a transaction. The use of mobile application(s) can simplify and automate the conveyance of transaction details between computing platforms and devices to allow a user to fully participate in a transaction approval process with a simplified, convenient experience.

19 Claims, 4 Drawing Sheets

AUTOMATING CALLS BETWEEN SEPARATE AND DISTINCT APPLICATIONS FOR INVOKING AN IDENTITY VERIFICATION FUNCTION

BACKGROUND OF THE INVENTION

The present invention relates to identity verification methods and, more particularly, to methods, software and systems for automating calls between separate and distinct applications through quick response (QR) codes and customer scheme uniform resource locators (URLs) for the purpose of invoking an identity verification function.

Many current transaction approval processes focus on relying party (i.e., the merchant) acceptance of a transaction, often predicated on a physical component (i.e., a credit card) and possibly a subjective decision (i.e., matching of handwritten signature). This model diminishes the importance and approval of the actual person whose identity is being asserted by the transaction.

There have been attempts to modernize identity verification processes. Many of these current methods require custom user registration and input which retards a user's ability to assert identify across disparate markets and systems. The details of a transaction, digital or otherwise, represent a complex set of operators that can limit the ability to seamlessly locate and invoke a corresponding system that can correctly process the transaction details. To date, most attempts to perform this type of operation are custom solutions for a given market, resulting in a disjointed set of applications and processes that leads to confusion and reduces acceptance by consumers.

As can be seen, there is a need for an improved identification verification process that can provide integration between disparate hardware and software systems.

SUMMARY OF THE INVENTION

In one aspect of the present invention, a method for verifying a person's identify for a transaction comprises sending a transaction request by a relying party to a web service; receiving a quick response (QR) code with a custom scheme uniform resource locator (URL); scanning the QR code on the person's mobile electronic device to invoke a mobile application that requests to identify and retrieve details of the transaction; and allowing the person to review and approve or reject the transaction by authenticating the status change of the transaction by sending authentication data from to the mobile application.

In another aspect of the present invention, a method for automating calls between separate and distinct applications for the purpose of invoking an identity verification function for a user comprises sending a transaction request by a relying party to a message queue, the message queue either generating a QR code for scanning by a user to generate a custom scheme uniform resource locator (URL) for operating system (OS) consumption or, when on the same hardware, renders the custom scheme uniform resource locator (URL) for OS consumption; invoking a mobile application registered to consume the custom scheme URL and utilizes a transaction ID to retrieve transaction details from the message queue; and reviewing and either accepting or rejecting a transaction.

These and other features, aspects and advantages of the present invention will become better understood with reference to the following drawings, description and claims.

DETAILED DESCRIPTION OF THE INVENTION

Figure 1:
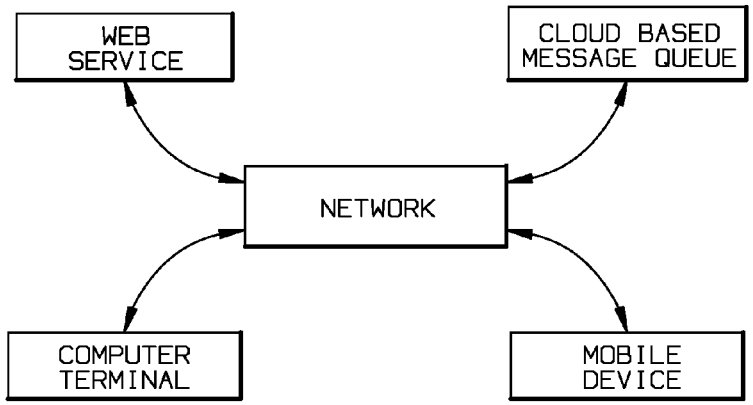
FIG. 1 is a system diagram showing system components according to an exemplary embodiment of the present invention.
Figure 2:
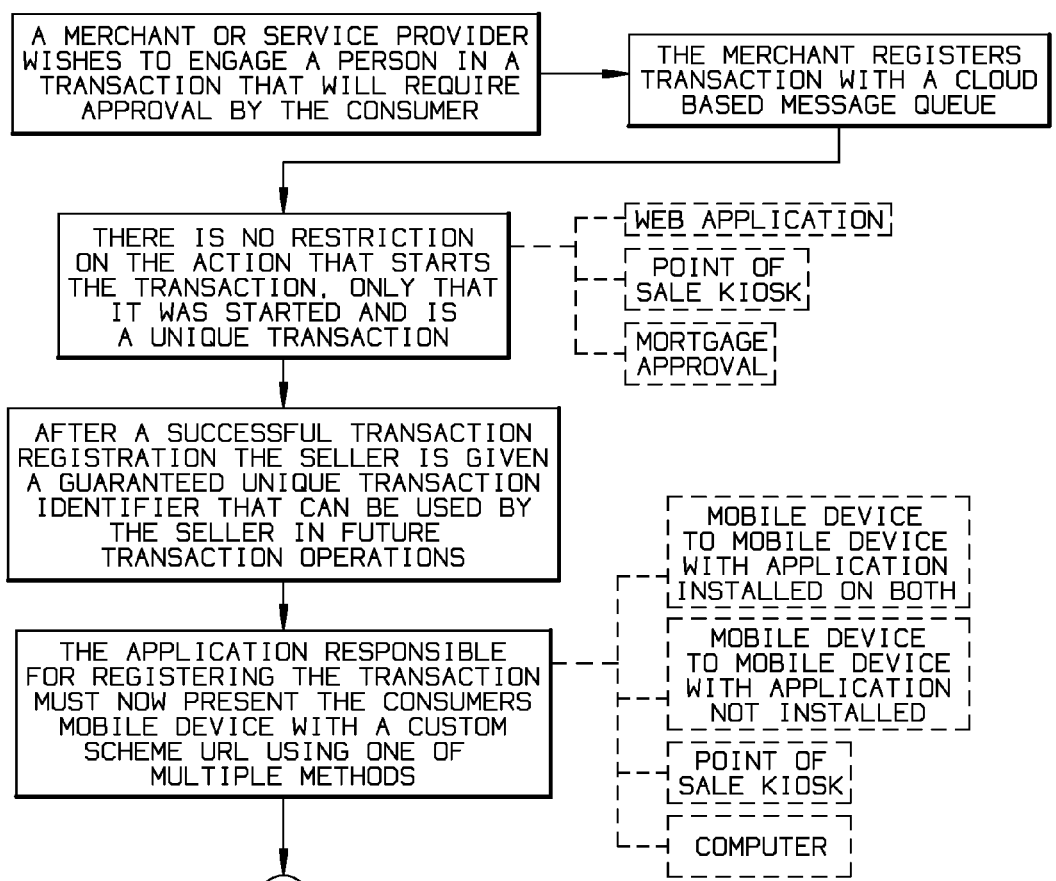
FIG. 2 is a flow chart describing an identity verification process according to an exemplary embodiment of the present invention.
Figure 3:
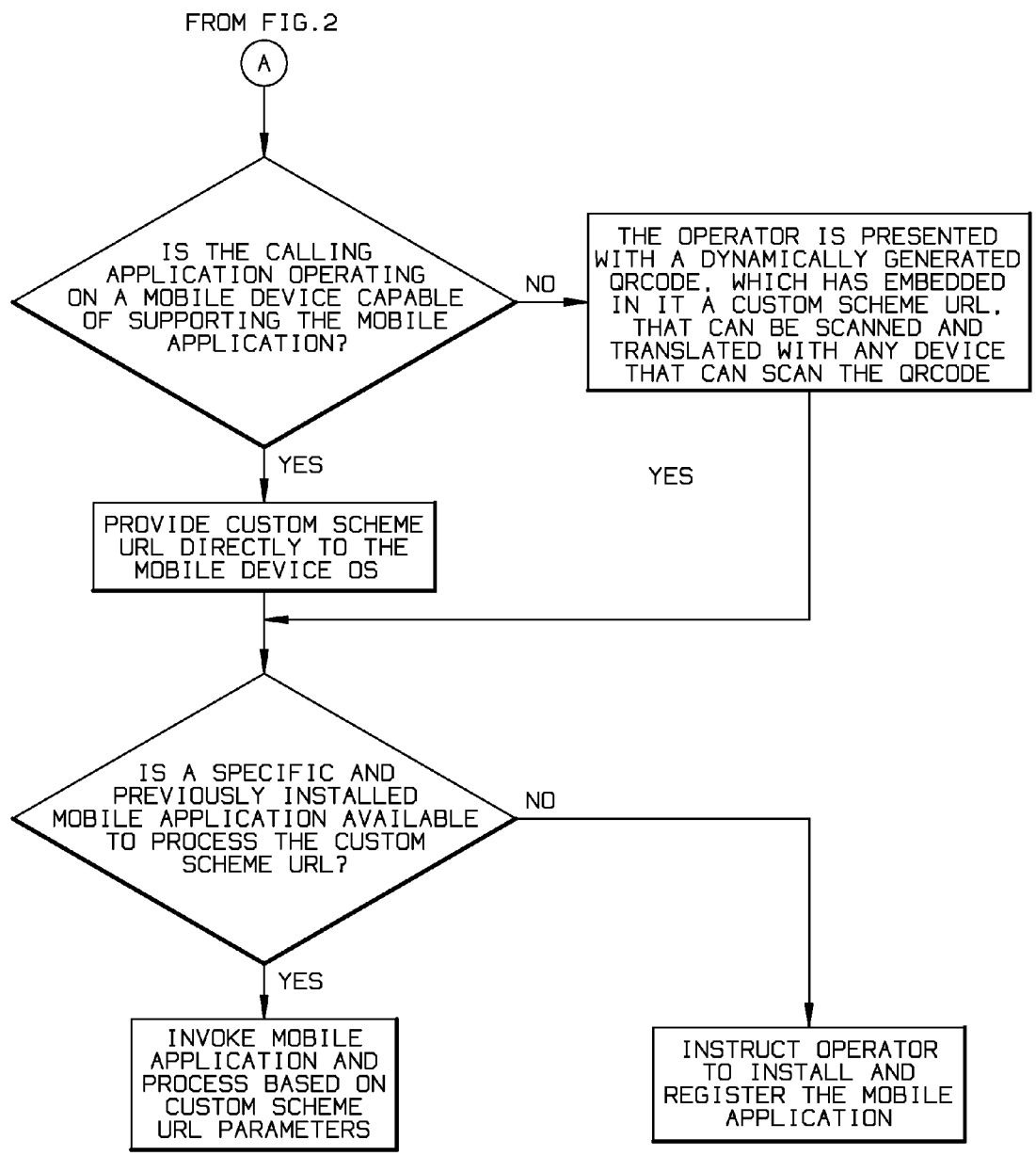
FIG. 3 is a continuation of the flow chart of FIG. 2.
Figure 4:
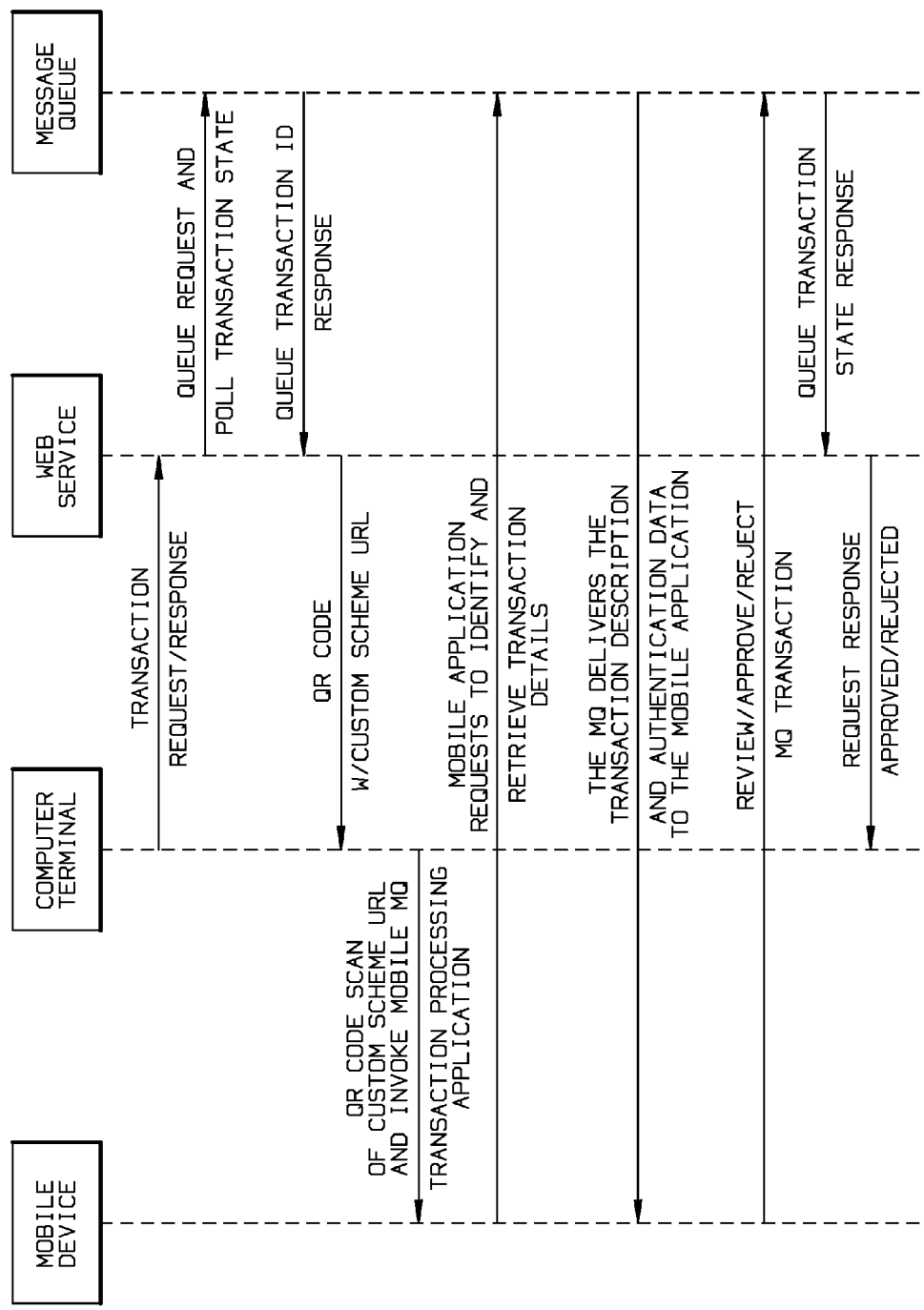
FIG. 4 is a schematic drawing showing interactions between a mobile device, a computer terminal, a web service and a message queue, according to an exemplary embodiment of the present invention, where swim lane shows the use of QR Code to convey the custom scheme URL from one physical hardware device (i.e., laptop) to another physical hardware device (i.e., mobile phone)
Figure 5:
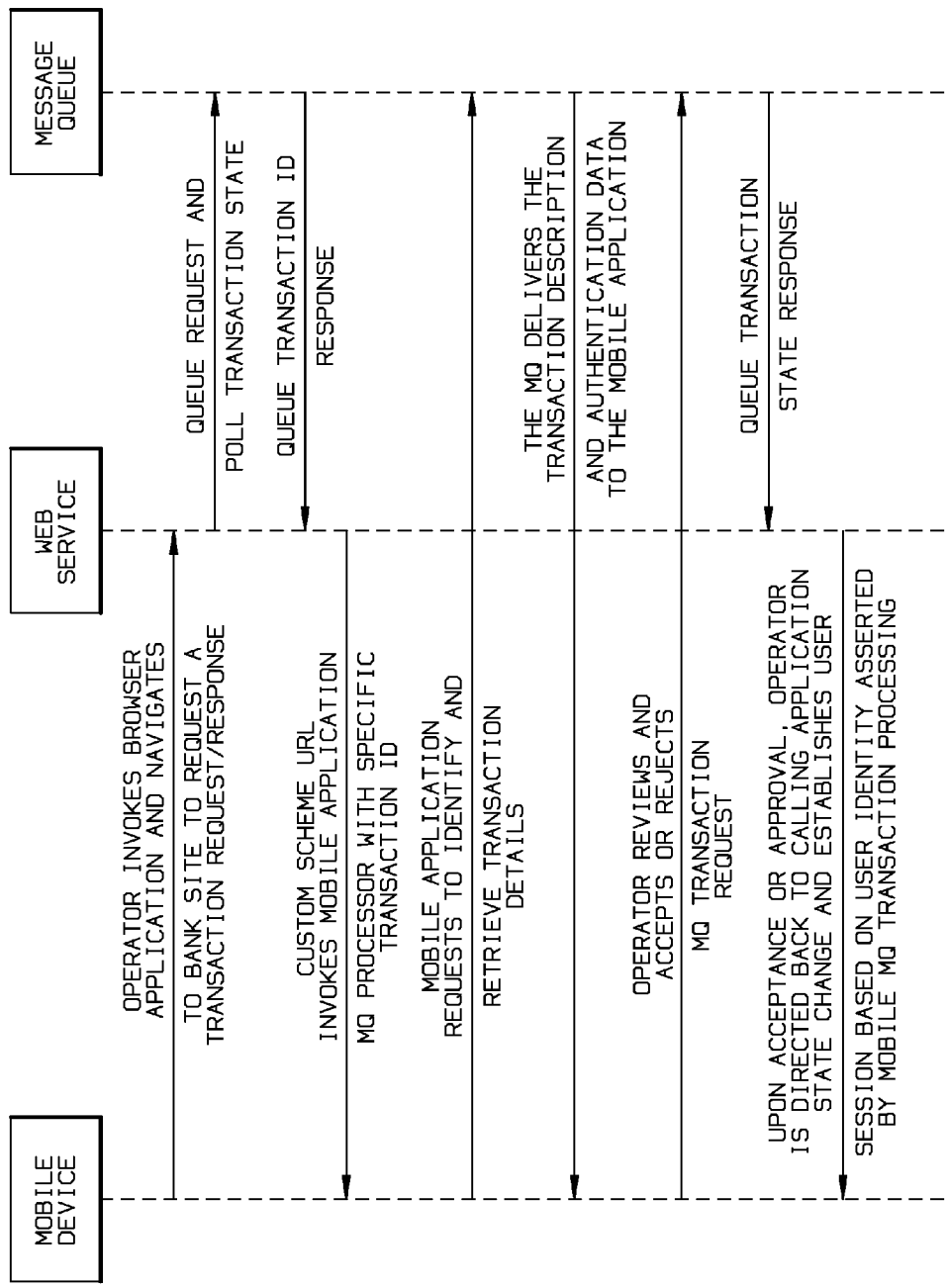
FIG. 5 is a schematic drawing showing interactions between a mobile device, a web service and a message queue, according to another exemplary embodiment of the present invention, where swim lane shows the use of only a custom scheme URL when both the relying application and the authentication application reside on the same physical hardware device (i.e., mobile phone).

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method, software and system for the novel and seamless integration between disparate hardware and software systems to facilitate strong authentication and identity assertion of an individual as an integral component of transaction processing. The method, software and system can combine quick response (QR) code(s) with more custom mobile device uniform resource locator (URL) scheme(s) to seamlessly invoke mobile application(s) that enable an end user to perform strong, multi-factor authentication as a component of completing a transaction. The use of mobile application(s) can simplify and automate the conveyance of transaction details between computing platforms and devices to allow a user to fully participate in a transaction approval process with a simplified, convenient experience.

Referring to the Figures, a computer system, acting as a transaction initiator, can create and submit transaction details and processing instructions to a message queue, typically a cloud-based transaction message queue. The computer system can receive a unique transaction identifier in the form of a message acceptance acknowledgement from message queue and optionally waits/polls for transaction status change (s).

A user in possession of at least one mobile device, capable of supporting mobile application(s), would need to register their identity (and any mobile devices they wish to use) with the cloud services. Once registered, they would need to download/install a mobile application specific to their device's operating System (OS) that is capable of invoking a mobile application based on a custom scheme URL. While there are multiple means for a device OS to be presented a custom scheme URL, the use of a QR code that encapsulates the custom scheme URL will be limited to those devices that are capable of scanning a QR code with a built-in camera. Once initiated, the mobile authentication application interacts with the cloud services message queue using a transaction-specific identifier to perform whatever identity proofing and transaction approval processing specific to the transaction.

The computer system can present a custom, mobile-device scheme URL as a Quick Response Code (QR code) that can be scanned/decoded by a QR code scanner on a mobile device. The mobile device operating system (OS) can infer from the custom scheme URL that the URL is to be consumed by a mobile application resident on the mobile device. The mobile device OS can invoke the mobile application. The mobile application can identify the transaction to be processed in the cloud-based message queue and can invoke transaction processing, including strong authentication, per rules and constraints specified within the cloud-based transaction.

Alternatively, when the computer system and the mobile device are the same physical device and operating system, no QR code is required and the computer system simply provides the custom scheme URL to the shared operating system which, in turn, infers from the custom scheme URL that the URL is to be consumed by the mobile application for processing.

A merchant, or other such service provider (relying party) that wishes to engage a person (end user, consumer) in a transaction that requires active participation and explicit approval by the consumer, can register a transaction with the cloud-based message queue. There is no restriction on what action within the seller's domain precipitated the transaction (i.e., from a web application, point-of-sale kiosk, mortgage approval, or the like), only that it happened and is unique for a given transaction. Upon successful transaction registration, the seller is returned a guaranteed unique transaction identifier that can be used by the seller in subsequent transaction operations.

The (relying party) application responsible for initiating/registering the transaction can now present the consumer with a custom scheme URL which, when presented to the consumer's mobile device OS, causes a specific mobile application (previously installed by the consumer) to be invoked. The actual delivery of the custom scheme URL can be achieved via several models. For example, if the consumer invoked the seller's application from a mobile device on which the consumer had previously installed the custom mobile application (tied to custom scheme URL), then the mobile device OS can simply consume the custom scheme URL and trigger the authentication application. If the consumer invoked the seller's application from a device that does not support a custom mobile application (i.e., a computer, a POS kiosk, a mobile device with no custom application installed), then a custom QR code can be presented which the consumer could capture using a mobile device which has the custom scheme URL support available (i.e., a smart-phone with a custom app installed and has the capability to scan a QR code).

A custom mobile device application can be triggered to guide user authentication and approval processing based on requirements defined by the cloud-based transaction details. This allows a given transaction to enforce disparate levels of authentication and approval and can leverage other factors such as geo-location of the mobile device to dynamically rate the authenticity of the transaction request.

Upon success (or failure) of the transaction authentication and approval, the cloud-based message queue is notified and the transaction state is modified to reflect the authentication and approval state. This state information can then be made available to the originating relying party application for a final disposition.

To make the system of the present invention, one would first need to identify target mobile application platform(s) and verify that each supported platform OS supports mobile application initiation via custom scheme URL. Next, one would need to identify custom scheme URL components; the minimum required components would include a custom protocol identifier, a text identifier specific to a mobile application that would be invoked by mobile OS that operates similar to Web-based URL protocols (i.e., HTTP, FTP, MAILTO) to identify consuming application, a cloud-based Message Queue (MQ) end point text identifier that represents a service end-point (i.e., a DNS name) for the message queue responsible for handling the transaction, a message queue transaction identifier which is a unique identifier assigned to cloud-based MQ transactions that identifies particular transaction within queue.

One or more mobile applications (one per identified target OS) can be developed that that can consume custom scheme URL(s) specific to your custom protocol identifier. The developed mobile applications can be distributed to distribution end-points (i.e., Apple App Store) from where interested clients can download/install the app.

One or more secure, cloud-based persistent message queues (MQ) can be established where unique transaction messages can be submitted via secure communication channel(s) by service providers (relying parties).

An API toolkit or other such components that facilitate development of the cloud-based MQ integration can be developed. While not germane to the invention, this represents a value-added component to increase adoption and acceptance by parties needing strong authentication and approval of transactions.

QR code generation services can be provided for sellers wishing to leverage QR technology that can be consumed by custom URL scheme mobile applications.

The present invention targets two distinct parties to a transaction; the provider (relying party) and the end user (authenticated transaction processor). In some embodiments, for example, for verification mobile banking transactions, the provider/relying party and the end user can be the same person.

For a provider, the invention and subsequent service offering(s), allow transactions to be strongly authenticated and approved via a mobile application. The processing and authentication rules can be dynamic and specific to a given transaction, which allows for increased scrutiny and certainty that the person on the other end of a transaction is truly who they say they are. For a consumer, the invention allows full participation of a transaction approval in a non-intrusive, secure, and easy manner using mobile applications deployed on devices that the consumer already owns and uses.

It should be understood, of course, that the foregoing relates to exemplary embodiments of the invention and that modifications may be made without departing from the spirit and scope of the invention as set forth in the following claims.

What is claimed is:

1. A method for automating calls between separate and distinct applications for the purpose of invoking an identity verification function for a user, the method comprising the steps of:

sending a transaction request by a relying party computer to a message queue, the message queue either generating a QR code for scanning by a user computer to generate a custom scheme URL for operating system consumption or, when the relying party computer and the user computer comprise the same hardware, rendering the custom scheme URL for operating system consumption;

invoking a mobile application registered to consume the custom scheme URL and utilizing a transaction ID to retrieve transaction details from the message queue;

reviewing and either accepting or rejecting a transaction.

2. The method of claim 1, wherein the transaction details include a requirement for additional authentication.

3. The method of claim 1, wherein the relying party computer is a merchant computer.

4. The method of claim 1, wherein the relying party computer is the user computer.

5. The method of claim 1, wherein the step of sending comprises the steps of:

sending the transaction request from the relying party computer to a web service; and sending a queue request from the web service to the message queue.

6. The method of claim 1, further comprising the step of sending a queue transaction state response from the message queue after the transaction is approved or rejected.

7. The method of claim 6, wherein the step of sending a queue transaction state response comprises notifying the relying party computer of an approval or rejection of the transaction.

8. The method of claim 1, wherein the mobile application is located on the user computer.

9. The method of claim 1, wherein the user computer comprises a mobile phone.

10. The method of claim 1, wherein the message queue comprises a cloud-based service.

11. The method of claim 1, further comprising authentication rules for authenticating the transaction.

12. The method of claim 11, wherein the authentication rules comprise geo-location restrictions.

13. The method of claim 11, wherein the authentication rules are based at least in part on the transaction request.

14. The method of claim 11, wherein the authentication rules are dynamically generated.

15. A system for automating calls between separate and distinct applications for the purpose of invoking an identity verification function for a user, comprising:

a relying party computer sending a transaction request to a message queue, the message queue either generating a QR code for scanning by a user computer to generate a custom scheme URL for operating system consumption or, when the relying party computer and the user computer comprise the same hardware, rendering the custom scheme URL for operating system consumption;

a mobile application registered to consume the custom scheme URL, utilizing a transaction ID to retrieve transaction details from the message queue, and allowing the user to review and either accept or reject a transaction.

16. The system of claim 15, wherein the relying party computer is a merchant computer.

17. The system of claim 15, wherein the relying party computer is the user computer.

18. The system of claim 15, wherein the user computer comprises a mobile phone.

19. The system of claim 15, wherein the message queue comprises a cloud-based service.

* * * * *